(12) United States Patent
Kwon

(10) Patent No.: US 11,528,491 B2
(45) Date of Patent: Dec. 13, 2022

(54) IMAGE ENCODING/DECODING METHOD AND DEVICE USING COLOR COORDINATE AXIS CONVERSION

(71) Applicant: INDUSTRY-ACADEMIA COOPERATION GROUP OF SEJONG UNIVERSITY, Seoul (KR)

(72) Inventor: Oh Jin Kwon, Hanam-si (KR)

(73) Assignee: INDUSTRY-ACADEMIA COOPERATION GROUP OF SEJONG UNIVERSITY, Seoul (KR)

(*) Notice: Subject to any disclaimer, the term of this patent is extended or adjusted under 35 U.S.C. 154(b) by 0 days.

(21) Appl. No.: 17/266,546

(22) PCT Filed: Oct. 23, 2019

(86) PCT No.: PCT/KR2019/013933
§ 371 (c)(1),
(2) Date: Feb. 5, 2021

(87) PCT Pub. No.: WO2020/091293
PCT Pub. Date: May 7, 2020

(65) Prior Publication Data
US 2021/0321120 A1     Oct. 14, 2021

(30) Foreign Application Priority Data
Nov. 1, 2018 (KR) .................. 10-2018-0132672

(51) Int. Cl.
*H04N 19/186* (2014.01)
*H04N 19/182* (2014.01)
*H04N 19/60* (2014.01)

(52) U.S. Cl.
CPC ......... *H04N 19/186* (2014.11); *H04N 19/182* (2014.11); *H04N 19/60* (2014.11)

(58) Field of Classification Search
None
See application file for complete search history.

(56) References Cited

U.S. PATENT DOCUMENTS

2017/0085894 A1* 3/2017 Ramasubramonian ...................... H04N 19/132

FOREIGN PATENT DOCUMENTS

| JP | 2011019204 A | * | 1/2011 |
| JP | 2011019204 A | | 1/2011 |
| KR | 10-2011-0096811 A | | 8/2011 |

* cited by examiner

*Primary Examiner* — Samuel D Fereja
(74) *Attorney, Agent, or Firm* — Goldilocks Zone IP Law

(57) ABSTRACT

Disclosed is image encoding/decoding method using color coordinate axis conversion, comprising the steps of: acquiring pixel distribution information, on first color coordinate system, about an image; determining, on the basis of the pixel distribution information, first component having the widest variance from among the components of the first color coordinate system; acquiring an intermediate color coordinate system by rotating, around a starting point, a coordinate axes of the first color coordinate system so that variance of the first component is maximized; determining a second component having the widest variance from among components excluding the first component in the intermediate color coordinate system; acquiring a second color coordinate system by rotating, around the starting point, a coordinate axis of the intermediate color coordinate system so that variance of the second color component is maximized; and encoding the image on the basis of pixel distribution information on the second color coordinate system.

16 Claims, 10 Drawing Sheets

IMAGE ENCODING/DECODING METHOD AND DEVICE USING COLOR COORDINATE AXIS CONVERSION

CROSS-REFERENCE TO RELATED APPLICATION

The present application is U.S. National Phase application under 35 U.S.C. § 371 of an International application No. PCT/KR2019/013933 filed on Oct. 23, 2019, which is based on and claims the benefit of convention priority to Korean Patent Application No. 10-2018-0132672, filed on Nov. 1, 2018 in the Korean Intellectual Property Office, the disclosure of which is incorporated by reference herein in its entirety.

TECHNICAL FIELD

The present disclosure relates to a method and device for encoding and decoding a picture using transformation of color coordinate axes and, more specifically, to a method and device for enhancing a compression efficiency by transforming axes of a YCbCr color coordinate system during an encoding or decoding of a picture.

BACKGROUND

With recent development of communication technologies, transmissions of pictures are rapidly increasing. However, a picture signal generally has an enormous data size and needs to be compressed to reduce transmission costs. Accordingly, standards for compressing still pictures such as Joint Photographic Experts Group (JPEG) and standards for compressing moving pictures such as Moving Picture Experts Group (MPEG) has been established.

However, picture qualities and compression ratios are still at issue regardless of the compression standards, and researches have been conducted to reduce the degradation of picture qualities and achieve higher compression ratio.

SUMMARY

Provided is a method of encoding and decoding a picture using a transformation of color coordinates axes.

Provided is a device for encoding and decoding a picture using the transformation of color coordinates axes.

According to an aspect of an embodiment, a picture encoding method includes: acquiring pixel distribution information for a picture in a first color coordinate system; determining a first color component showing a largest variance in pixel values among color components of pixels in the first color coordinate system on the basis of the pixel distribution information; rotating coordinate axes of the first color coordinate system around an origin such that the variance of the first color component is maximized to acquire an intermediate color coordinate system; determining a second color component showing a larger variance in pixel values between color components, excluding the first color component, of the intermediate color coordinate system; rotating coordinate axes of the intermediate color coordinate system around the origin such that the variance of the second color component is maximized to acquire a second color coordinate system; and encoding the picture on the basis of pixel distribution information in the second color coordinate system.

The method may further include: generating coordinate axes transformation information for the picture on the basis of a difference between the pixel distribution information in the first color coordinate system and the pixel distribution information in the second color coordinate system.

The method may further include generating additional information about the picture on the basis of the coordinate axes transformation information for the picture.

The method may further include: determining whether to transform coordinate axes for the picture on the basis of a difference between the pixel distribution information on the first color coordinate system and the pixel distribution information on the second color coordinate system.

The method may further include: generating information of whether the coordinate axes are transformed or not depending on whether the coordinate axes are transformed or not; and generating additional information about the picture based on the information of whether the coordinate axes are transformed or not.

The operation of acquiring the pixel distribution information for the picture in the first color coordinate system may include: acquiring the pixel distribution information for the picture in the first color coordinate system on the basis of pixel distribution information for at least one another picture in the first color coordinate system.

The method may further include: generating additional information about the picture on the basis of information about the at least one another picture.

The first color coordinate system may include a YCbCr color coordinate system, and the first color component may include a Y-component.

According to another aspect of an embodiment, a picture encoding device includes: a processor; and a memory storing at least one instruction to be executed by the processor. When executed by the processor, the at least one instruction causes the processor to: acquire pixel distribution information for a picture in a first color coordinate system; determine a first color component showing a largest variance in pixel values among color components of pixels in the first color coordinate system on the basis of the pixel distribution information; rotate coordinate axes of the first coordinate system around an origin such that the variance of the first color component is maximized to acquire an intermediate color coordinate system; determine a second color component showing a larger variance in pixel values between color components, excluding the first color component, of the intermediate color coordinate system; rotate coordinate axes of the intermediate color coordinate system around the origin such that the variance of the second color component is maximized to acquire a second color coordinate system; and encode the picture on the basis of pixel distribution information in the second color coordinate system.

The at least one instruction may further include an instruction causing the processor to: generate coordinate axes transformation information for the picture on the basis of a difference between the pixel distribution information in the first color coordinate system and the pixel distribution information in the second color coordinate system.

The at least one instruction may further include an instruction causing the processor to: generate additional information about the picture on the basis of the coordinate axes transformation information for the picture.

The at least one instruction may further include an instruction causing the processor to: determine whether to transform coordinate axes for the picture on the basis of a difference between the pixel distribution information on the first color coordinate system and the pixel distribution information on the second color coordinate system.

The at least one instruction may further include an instruction causing the processor to: generate information of whether the coordinate axes are transformed or not depending on whether the coordinate axes are transformed or not; and generate additional information about the picture based on the information of whether the coordinate axes are transformed or not.

The at least one instruction may further include an instruction causing the processor to: acquire the pixel distribution information for the picture in the first color coordinate system on the basis of pixel distribution information for at least one another picture in the first color coordinate system.

The at least one instruction may further include an instruction causing the processor to: generate additional information about the picture on the basis of information about the at least one another picture.

The first color coordinate system may include a YCbCr color coordinate system, and the first component may include a Y-component.

The present disclosure enhances the compression efficiency when the picture is encoded using a YCbCr color coordinate system such as in JPEG and MPEG compressions.

The present disclosure is applicable to various picture encoding methods since the transformation of color coordinate axes are performed in early stage of a picture encoding procedure.

BRIEF DESCRIPTION OF THE DRAWINGS

In order that the disclosure may be well understood, there will now be described various forms thereof, given by way of example, reference being made to the accompanying drawings, in which.

Figure 1:
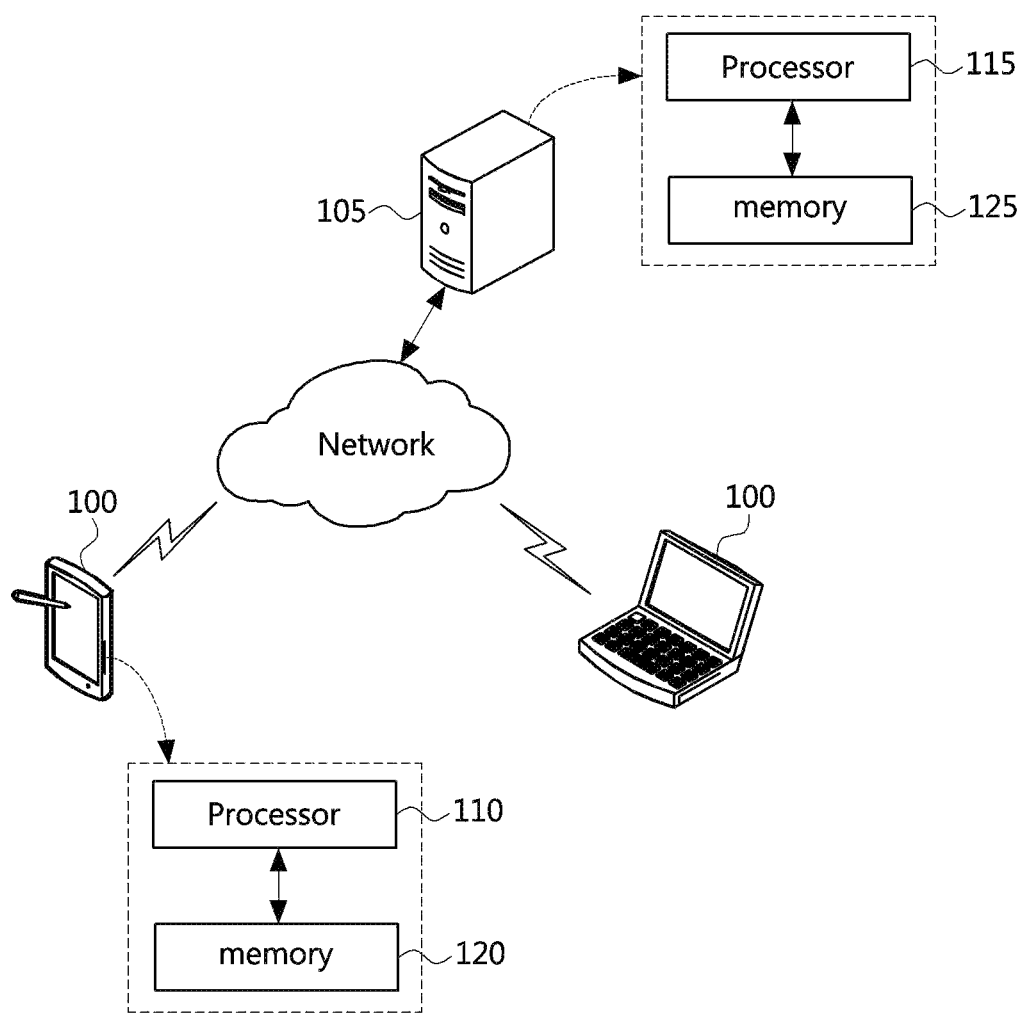
FIG. 1 is a schematic diagram of a picture encoding and decoding system.

The drawings described herein are for illustration purposes only and are not intended to limit the scope of the present disclosure in any way.

DETAILED DESCRIPTION

While the present disclosure is susceptible to various modifications and alternative embodiments, specific embodiments thereof are shown by way of example in the accompanying drawings and will be described in detail. However, it should be understood that there is no intention to limit the present disclosure to the particular forms disclosed, but rather the present disclosure is to cover all modifications, equivalents, and alternatives falling within the spirit and scope of the present disclosure. Like numbers refer to like elements throughout the description of the drawings.

It will be understood that, although the terms first, second, A, B, etc. may be used herein to describe various elements, the elements should not be limited to the terms. The terms are only used to distinguish one element from another. For example, a first element could be termed a second element, and, similarly, a second element could be termed a first element, without departing from the scope of the present disclosure. As used herein, the term "and/or" includes any one or combination of the associated listed items.

It will be understood that when an element is referred to as being "connected" or "coupled" to another element, it can be directly connected or coupled to another element or be connected or coupled to another element with still another element disposed therebetween. In contrast, when an element is referred to as being "directly connected" or "directly coupled" to another element, there are no intervening elements present.

The terminology used herein is for the purpose of describing particular embodiments only and is not intended to be limiting to the present disclosure. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Typically, a video may include a series of still pictures, and the still pictures may be divided in units of groups of pictures (GOPs), and each still picture may be referred to as a picture or frame. As an upper concept, a GOP, a sequence, and other units may exist, and each picture may be divided into predetermined areas such as slices, tiles, blocks, and the like. In addition, a single GOP may be grouped in units of I pictures, P pictures, and B pictures. The I picture may refer to a picture that is encoded/decoded by itself without using a reference picture, and the P picture and the B picture refer to pictures encoded/decoded by performing processes, such as motion estimation, motion compensation, and the like, using a reference picture. In general, in the case of a P picture, an I picture and a P picture may be used as a reference picture, and in the case of a B picture, an I picture and a P picture may be used as a reference picture, but the above described definition may be changed by a setting of encoding/decoding.

Here, a picture referenced for encoding/decoding is referred to as a reference picture, and a block or pixel referenced for encoding/decoding is referred to as a reference block or a reference pixel. In addition, data referenced for encoding/decoding may include not only pixel values of a spatial domain, but also coefficient values of a frequency domain, and various pieces of encoding/decoding information generated and determined during encoding/decoding processes.

The minimum unit constituting a picture may be a pixel, and the number of bits used to represent one pixel is referred to as a bit depth. In general, the bit depth may be 8 bits, and different bit depths may be supported according to encoding settings. As for the bit depth, at least one bit depth may be supported according to a color space. In addition, a picture may be constructed as at least one color space according to a color format of a picture. A picture may be constructed as one or more pictures having a predetermined size or one or more pictures having different sizes according to the color formats. For example, in the case of YCbCr 4:2:0, a picture may be composed of one luminance component (Y in the present example) and two color difference components (Cb/Cr in the present example), in which the color difference component and the luminance components may be composed in a horizontal length-vertical length composition ratio of 1:2. As another example, in the case of YCbCr 4:4:4, the color difference component and the luminance components may be composed in a composition ratio of a horizontal length and a vertical width that are same as each other. As in the above example, when one or more color spaces are constructed, a picture may be partitioned into the respective color spaces.

In the present disclosure, descriptions will be made based on a partial color space (Y in the present example) according to a partial color format (YCbCr in the present example), and the remaining color spaces (in the present example, Cb and Cr) according to the color format may be subject to the same or a similar application (a setting dependent on a specific color space). However, each color space may also have a partially different applications (a setting independent of a specific color space). In other words, the setting dependent on each color space may refer to a setting proportional to or dependent on the composition ratio of respective components (for example, 4:2:0, 4:2:2, or 4:4:4), and the setting independent of each color space may refer to a setting independent of the composition ratio of respective components, or a setting independently given only for the corresponding color space. In the present disclosure, depending on the encoder/decoder, some configurations may have an independent setting or a dependent setting.

Setting information or syntax elements required in the picture encoding process may be determined at a unit level of video, sequence, picture, slice, tile, block, and the like and may be included in a bit stream in units of video parameter sets (VPSs), sequence parameter sets (SPSs), picture parameter sets (PPSs), slice headers, tile headers, or block headers and transmitted to the decoder. The decoder may perform parsing in units of the same level as that in the encoder to reconstruct the setting information transmitted by the encoder and use the setting information in the picture decoding process. Each parameter set has an identifier (ID) value, and a lower parameter set may have an ID value for referring to an upper parameter set is referenced. For example, a lower parameter set may refer to information about an upper parameter set having an ID value that matches that of the lower parameter among one or more upper parameter sets. In the above described examples of various units, a certain unit including one or more other units may be referred to as an upper unit, and the included units may be referred to as lower units.

In the case of setting information generated from the upper unit, each unit may include information about an independent setting or may include content about a setting dependent on a previous, subsequent, upper unit, or the like. Here, the dependent setting may be understood as setting information of the corresponding unit that is represented as flag information indicating that the unit follows the setting of the previous, subsequent, and upper unit (e.g., following with a 1-bit flag of 1 and not following with a 1-bit flag of 0). The setting information in the present disclosure will be described based on an example of an independent setting, but the present disclosure may include an example of addition or substitution about a dependence on the setting information of the previous, subsequent, or upper unit of the current unit.

In the encoding/decoding of a video, in general, the encoding/decoding may be performed according to an input size, but encoding/decoding may also occur through size adjustment. For example, in a hierarchical encoding scheme (scalable video coding) to support scalability of spatial, temporal, and picture quality, adjustment of overall resolution, such as expansion and reduction of a picture may exist, or expansion and reduction of a partial picture may exist. The corresponding information may be switched by allocating selection information in the units, such as a VPS, a SPS, a PPS, and a Slice Header described above. In this case, the upper and lower relationship between the units may be set in the order of VPS, SPS, PPS, and Slice Header.

Hereinafter, embodiments of the present disclosure will be described in detail with reference to the accompanying drawings.

FIG. 1 is a schematic diagram of a picture encoding and decoding system.

Referring to FIG. 1, a picture encoding device 105 and a picture decoding device 100 may be a user terminal such as a personal computer (PC), a notebook computer, a personal digital assistant (PDA), a portable multimedia player (PMP), a PlayStation Portable (PSP), a wireless communications terminal, a smart phone, or a television (TV), or a server such as an application server and a service server. Also, the picture encoding device 105 and the picture decoding device 100 may be one of various apparatuses which includes a communication device such as a communication modem configured to communicate with other devices through wired or wireless communication networks, a memory 120 or 125 configured to store programs and data for performing an inter frame prediction or an intra frame prediction to encode or decode the picture, and a processor 110 or 115 configured to perform operations and controls by executing the programs.

A picture encoded into a bitstream by the picture encoding device 105 is transmitted to the picture decoding device 100 in real time or non-real time through a wired or wireless communications network such as Internet, a short-range wireless communications network, a wireless local area network (LAN), a WiBro network, and a mobile communications network, or through a communication interface such as a cable or universal serial bus (USB). The picture bitstream may be decoded by the picture decoding device 100 to be reconstructed and reproduced as the original picture. Also, the picture encoded into the bitstream by the picture encoding device 105 may be transferred from the picture encoding device 105 to the picture decoding device 100 through a computer-readable recording medium.

The picture encoding device and the picture decoding device described above may be separate devices or may be integrated into a single picture encoding and decoding device. In a latter case, some components of the picture encoding device may overlap with some components of the picture decoding device, and thus the picture encoding and decoding device may include duplicate components or may be implemented such that a shared component may perform common functions.

Accordingly, in the following descriptions for configurations and operations of embodiments, repetitive description of the overlapping components and operation principles thereof will be omitted for simplicity. Further, since the picture decoding device may be a computing device that performs reverse operations of the picture encoding process performed by the picture encoding device, the following description will be focused on the picture encoding device.

The computing device may include a memory storing a program or a software module for implementing a picture encoding method and/or a picture decoding method, and a processor connected to the memory to execute the program. Here, the picture encoding device may be abbreviated as a picture encoder and the picture decoding device may be abbreviated as a picture decoder.

Figure 2:
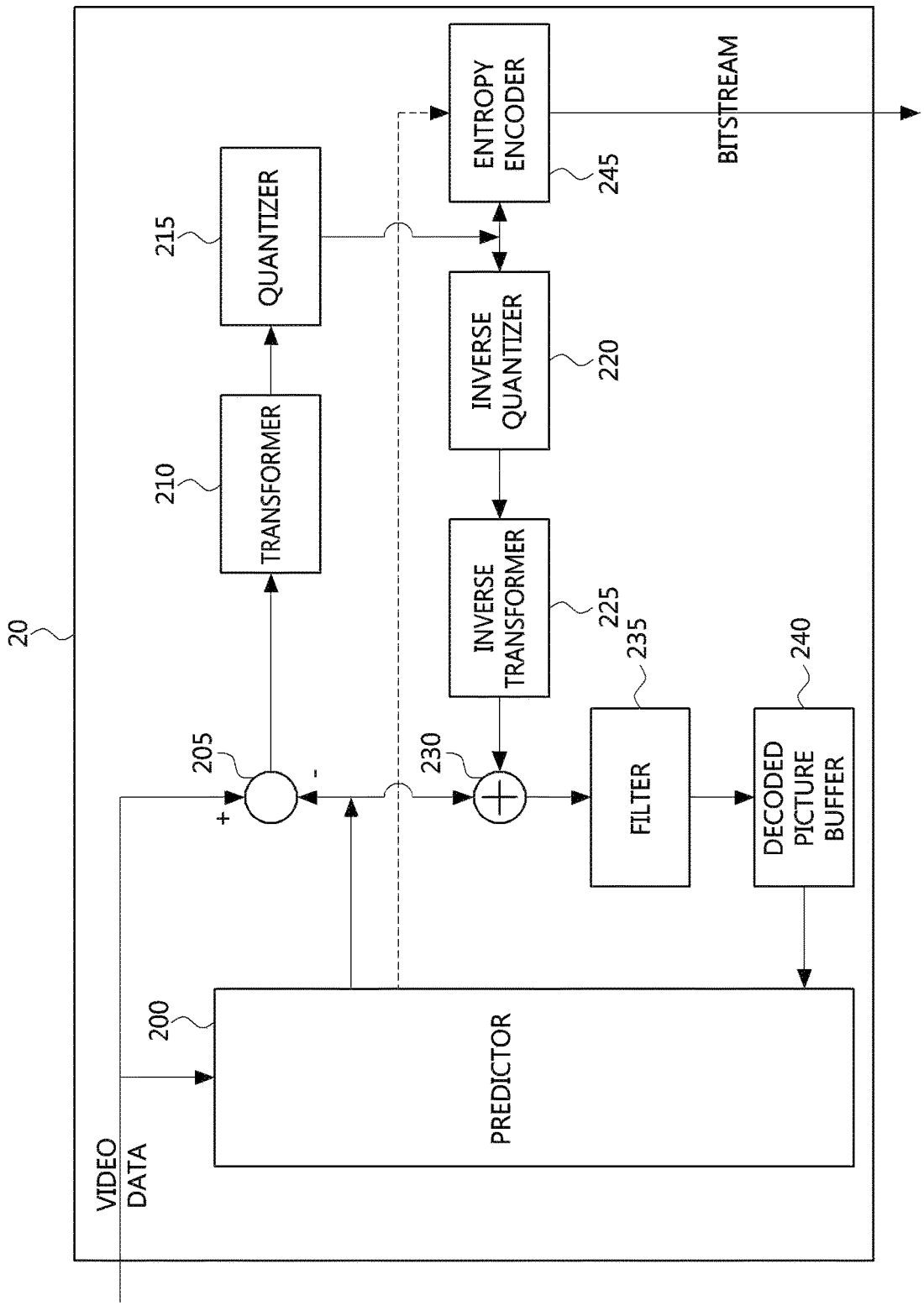
FIG. 2 is a block diagram of a picture encoding device.

FIG. 2 is a block diagram of the picture encoding device.

Referring to FIG. 2, a picture encoding device 20 may include a predictor 200, a subtractor 205, a transformer 210, a quantizer 215, an inverse quantizer 220, an inverse transformer 225, an adder 230, a filter 235, an encoded picture buffer 240, and an entropy encoder 245.

The predictor 200, which may be implemented using a prediction software module, may form a prediction block for a block to be encoded by performing the intra frame prediction or the inter frame prediction for the block. The predictor 200 may form the prediction block by predicting the current block to be encoded at the present time. In other words, the predictor 200 may predict pixel values of the pixels in the current block to be encoded by the intra frame prediction or the inter frame prediction to form the prediction block in which the pixels have the predicted pixel values. The predictor 200 may output information required for forming the prediction block such as information about a prediction mode, i.e., the intra frame prediction or the inter frame prediction, so that such information may be encoded with the pixel values.

The subtractor 205 may subtract the prediction block from the current block to form a residual block. In other words, the subtractor 205 may form the residual block containing a residual signal in a block unit by calculating a difference between a pixel value of each pixel in the current block and a pixel value of each pixel in the prediction block. Also, the subtractor 205 may generate the residual block according to a unit other than the block that is obtained by a partitioning of the block, which will be described below.

The transformer 210 may transform the residual block into a frequency domain to transform pixel values of the residual block into transform coefficients. Here, the transformer 210 may transform the residual signal into the frequency domain using at least one of various transform schemes that transform a spatial domain picture signal into a frequency domain picture signal such as Hadamard transform, discrete cosine transform (DCT)-based transform, discrete sine transform (DST)-based transform, and Karuneen Lube transform (KLT)-based transform. The transformation of spatial domain pixel values yields the transform coefficients.

A size or shape of a transform block may be determined through a block partitioning which will be described below. A square or rectangular block may formed according to the block partitioning. The block partitioning operation may be affected by transform-related settings, supported by the encoding and decoding device, such as the size or shape of the transform block.

The size and shape of each transform block may be determined according to a cost for encoding each candidate size and candidate shape for the transform block. The picture data of each transform block may be encoded along with partitioning information such as the size and shape of the transform block.

The transform may be performed by using a one-dimensional transform matrix. Each transform matrix may be used adaptively in a horizontal or vertical direction. The adaptive use of the transform matrix may be determined by various factors such as the size of the block, the shape of the block, the type of the block (e.g., luminance and chroma difference), an encoding mode, the prediction mode, a quantization parameter, and encoding information for neighboring blocks, but the present disclosure is not limited thereto.

For example, in case that the prediction mode is a horizontal mode in the intra frame prediction, a DCT-based transform matrix may be used in the vertical direction while a DST-based transform matrix may be used in the horizontal direction. On the other hand, in case that the prediction mode is a vertical mode in the intra frame prediction, the DCT-based transform matrix may be used in the horizontal direction while the DST-based transform matrix may be used in the vertical direction. However, the transform matrix is not limited thereto.

Transform-related information may be determined according to one or more factors among the size of the block, the shape of the block, the encoding mode, the prediction mode, the quantization parameter, and the encoding information for the neighboring blocks, and may be signaled implicitly or explicitly. The transform-related information may be transmitted in a unit of a sequence, a picture, a slice, or a block.

For an example of an explicit signaling of the transform-related information, when there are two or more transform matrices for horizontal and vertical directions as a group of candidates, the transform-related information signaled to a decoder may include information about transform matrix having been used for each direction. Also, the transform-related information signaled to the decoder may include information of a pair of transform matrices having been used for the horizontal and vertical directions selected from a group of candidates consisting of a plurality of pairs.

Meanwhile, transforms may be omitted partially or entirely in depending on the characteristics of the picture. For example, transforms of one or both of the horizontal and vertical components may be omitted when the intra frame prediction or the inter frame prediction is not properly performed and the difference between the current block and the prediction block is large since an encoding loss may be large due to an increase in the prediction residuals in such a case. The omission may be determined according to one or more factors among the encoding mode, the prediction mode, the size of the block, the shape of the block, the type of the block (e.g., luminance and chroma difference), the quantization parameter, and the encoding information for the neighboring blocks. The omission of transforms may be signaled implicitly or explicitly and may be transmitted in a unit of the sequence, the picture, and the slice.

The transformer 210 may provide information required to perform the transform process (e.g., setting information such as a size of the transform, a form of the transform, type of the transform, a number of times of the transforms, and whether the transform was applied) to the entropy encoder 245, so that the entropy encoder 245 encodes the such information.

The quantizer 215 may quantize the transform coefficients for the residual block. The quantizer 215 may quantize the transform coefficients for the transformed residual block by a dead zone plus uniform threshold quantization, a quantization using a weighted matrix, an improved quantization scheme thereof, or the like. The quantizer 215 may set one or more of the quantization schemes as candidates and select one according to the encoding mode or the prediction mode. The quantization parameter may be determined in a unit of a block. Also, the quantization parameter may be determined in a unit of the sequence, the picture, the slice, or blocks.

In an embodiment, the quantizer 215 may predict a current quantization parameter using one or more quantization parameters derived from neighboring blocks such as left, upper left, upper, upper right, and lower left blocks of the current block. Here, when there happens a change or addition of available neighboring blocks such as right and lower right blocks due to a change in an encoding order of or the like, the quantizer 215 may predict the current quantization parameter reflecting such a change.

When there exists no quantization parameter predicted from the neighboring blocks, i.e., the current block is located at a boundary of the picture or the slice, or the like, the quantizer 215 may output or transmit a difference from a basic parameter transmitted in a unit of the sequence, the picture, or the slice. However, when there is a quantization parameter predicted from the neighboring blocks, the quantizer 215 may transmit a difference calculated using the quantization parameter of the corresponding block.

The quantizer 215 may have a quantization weighted matrix to apply to an inter frame coding unit or an intra frame coding unit. Also, the quantizer 215 may apply a different weighted matrix according to the inter frame prediction mode. The weighted matrix may have a size of M×N. In case that the quantization block size is the same as the block size, the quantization coefficients may be set to be different for each position of the frequency components. Also, the quantizer 215 may employ one of the various existing quantization methods, and a same quantization method may be employed in the encoding device and the decoding device. Information about the quantization method may be signaled in a unit of the sequence, the picture, or the slice.

The quantizer 215 may transfer information required for performing the quantization process (e.g., the setting information such as the quantization parameter, the quantization type, whether the quantization was applied, and a quantization range, and the quantization matrix) to the entropy encoder 245, so that the entropy encoder 245 encodes the setting information.

The inverse quantizer 220 inversely quantizes the quantized coefficients quantized by the quantizer 215 for the residual block. That is, the inverse quantizer 220 inversely quantizes the quantized transform coefficients to generate frequency domain coefficients for the residual block.

The inverse transformer 225 inversely transforms the transform coefficients output by the inverse quantizer 220 for the residual block. In other words, the inverse transformer 225 inversely transforms the transform coefficients for the residual block to reconstruct spatial domain pixel values for the residual block. The inverse transformer 225 may perform the inverse transformation through an inverse process of the transform process used by the transformer 210.

The adder 230 reconstructs the current block by adding the prediction block predicted by the predictor 200 and the residual block reconstructed by the inverse transformer 225. The reconstructed current block may be stored in the encoded picture buffer 240 as a reference picture or a reference block and may be used as a reference when a next block following the current block, another block, or another picture is encoded in the future.

The filter 235 may performs one or more post-filtering processes such as a deblocking filtering, a sample adaptive offset (SAO), and an adaptive loop filter (ALF). The deblocking filter may remove a block distortion occurring at a boundary between blocks in a reconstructed picture. The ALF may perform the filtering based on a value obtained by comparing a picture reconstructed by filtering the block distortion through the deblocking filter with the original picture. The SAO algorithm may add an offset, which is a difference from the original picture, to each pixel in the residual block to which the deblocking filter was applied. Such post-processing filters may be applied to a reconstructed picture or block.

The deblocking filter may be applied to pixels in several columns or rows included in blocks disposed on both sides of block boundaries. It may be preferable that the deblocking filter is applied to the boundaries of the encoded block, the prediction block, and the transform block. Also, the deblocking filter may be applied limitedly to a block having a size larger than or equal to a predetermined minimum size (for example, 8×8 block).

Whether to apply a deblocking filter and a strength of the deblocking filter may be determined based on properties of the block boundaries. The strength of the deblocking filtering may be chosen among the candidates consisting of strong filtering, intermediate filtering, and weak filtering. When a block boundary corresponds to a boundary of partitioned unit, whether to apply a filter may be determined according to a flag indicating an application of an in-loop filter at the boundary of the partitioned unit. The application of the deblocking filter in various cases according to the present disclosure will be described below.

The SAO may be applied based on a difference between the reconstructed picture and the original picture. Types of the offset may include an edge offset and a band offset. One of those offsets may be selected according to characteristics of the picture, and the filtering may be performed for the selected offset. Meanwhile, information related to the offset may be encoded in a unit of a block and, in particular, may be encoded using a predicted value thereof. In such a case, the offset-related information may be adaptively encoded depending on whether the predicted value is correct or not. The predicted value may be offset information in adjacent blocks (for example, left, upper, upper left, or upper right block), and selection information about a block from which the offset information is obtained may be generated.

A validity check may be performed when a group of candidates is configured. A candidate is included in the group of candidates in case that the candidate is valid, but the validity check is passed to a next candidate when the candidate is invalid. A candidate may be regarded as being invalid also when a neighboring block is located outside the picture, does not belong to a partitioned unit to which the current block belongs, or cannot be referenced as described below.

The encoded picture buffer 240 may store a block or picture reconstructed by the filter 235. The reconstructed block or picture stored in the encoded picture buffer 240 may be provided to the predictor 200 performing the intra frame prediction or the inter frame prediction.

The entropy encoder 245 scans quantized transform coefficients according to a certain scanning pattern and encodes the quantized transform coefficients using an entropy encoding scheme. The scanning pattern may be one of various patterns such as a zigzag scan, a diagonal scan, and a raster scan. In addition, the entropy encoder 245 may encode various information including those received from the internal components of the encoder and output the encoded data as a bitstream.

Figure 3:
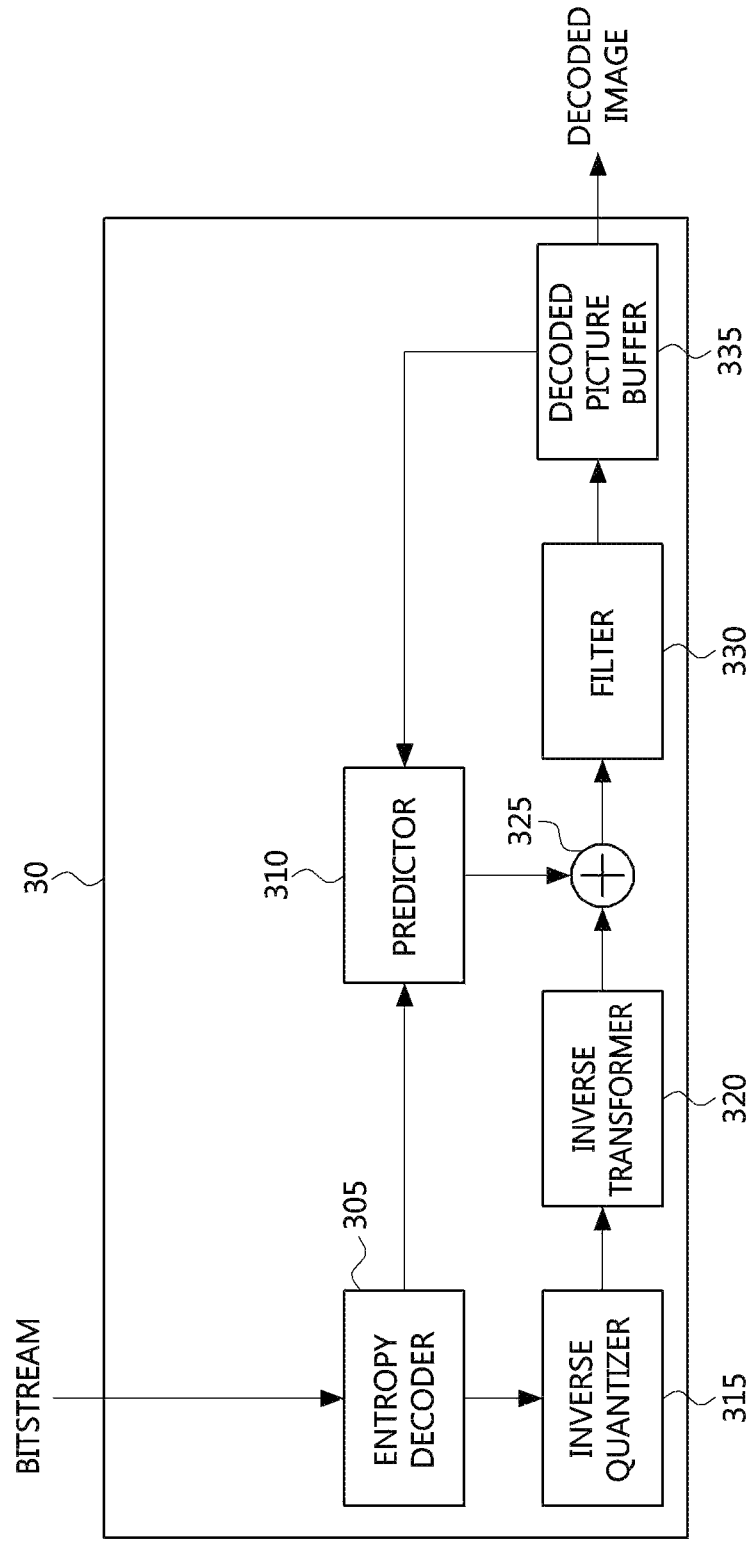
FIG. 3 is a block diagram of a picture decoding device.

FIG. 3 is a block diagram of a picture decoding device.

Referring to FIG. 3, the picture decoding device 30 includes an entropy decoder 305, a predictor 310, an inverse quantizer 315, an inverse transformer 320, an adder/subtractor 325, a filter 330, and a decoded picture buffer 335.

The predictor 310 may include an intra frame predictor module and an inter frame predictor.

First, a picture bitstream received by the picture encoding device 20 may be transferred to the entropy decoder 305.

The entropy decoder 305 may decode the bitstream to obtain decoded data including the quantized transform coefficients and encoding information provided by components of the encoder.

The predictor 310 may generate the prediction block based on the data output by the entropy decoder 305. At this time, the predictor 310 may construct a reference picture list by a default configuration scheme based on reference pictures stored in the decoded picture buffer 335.

The intra frame predictor may include a reference pixel constructor, a reference pixel filter, a reference pixel interpolator, a prediction block generator, and a prediction mode decoder. The inter frame predictor may include a reference picture constructor, a motion compensator, and motion information decoder. Some components of the predictor may perform the same process as those of the predictor in the picture encoding device, and the other components of the predictor may perform inverse operations of those of the predictor in the picture encoding device.

The inverse quantizer 315 may inversely quantize the quantized transform coefficients output by the entropy decoder 305.

The inverse transformer 320 may generate the residual block by applying an inverse DCT, an inverse integer transform, or a similar inverse transform scheme to the transform coefficients.

The inverse quantizer 315 and the inverse transformer 320 may perform inverse operations of those performed by the transformer 210 and the quantizer 215 of the picture encoding device 20 described above and may be implemented in various methods. For example, the inverse quantizer 315 and the inverse transformer 320 may share the functionalities with the transformer 210 and the quantizer 215 to perform the inverse process and the inverse transform, or may perform inverse operations of the transform and the quantization by use of the information about the transform and the quantization processes received from the picture encoding device 20 (e.g., the type and size of the transform, and the type of the quantization).

The residual block generated after the inverse quantization and the inverse transform processes may be added to the prediction block output by the predictor 310 to generate a reconstructed picture block. The addition may be performed by the adder/subtractor 325.

The filter 330 may apply a deblocking filter to the reconstructed picture block as required to remove the blocking effect. The filter 330 may additionally use other loop filters before or after the decoding process to enhance the picture quality.

The picture block resulted from the reconstruction and filtering processes may be stored in the decoded picture buffer 335.

A process of transforming color coordinate axes according to an embodiment of the present disclosure may be performed before the picture encoding method described above or after the picture decoding method described above. Though the picture encoding and/or decoding methods was described above in terms of an embodiment of an MPEG compression scheme, the present disclosure is not limited thereto and may be used for a JPEG compression scheme and other various picture encoding and/or decoding schemes.

Figure 4:
FIG. 4 shows a sample picture.

FIG. 4 shows a sample picture.

A color picture acquired by a photographing device such as a camera is generally represented by pixel values in an RGB color space, and a picture which is to be displayed to a user after a decoding process may be represented by pixel values in the RGB color space also.

The RGB color space refers to a system in which each pixel in a picture is represented by three chromaticities of Red (R), Green (G), and Blue (B), and a color of a pixel may be represented by intensities of the three chromaticity components.

Referring to FIG. 4, the sample picture is a still picture in which 512 pixels may be arranged in horizontal and vertical directions, and thus may include a total of 262,144 (512× 512) pixels. Each pixel may have R, G, and B values, and each of the R, G, and B value may have an integer ranging from 0 to 255.

A picture encoding method using color coordinate axes transformation according to an embodiment of the present disclosure will be described using the sample picture with reference to FIGS. 5-7.

Figure 5:
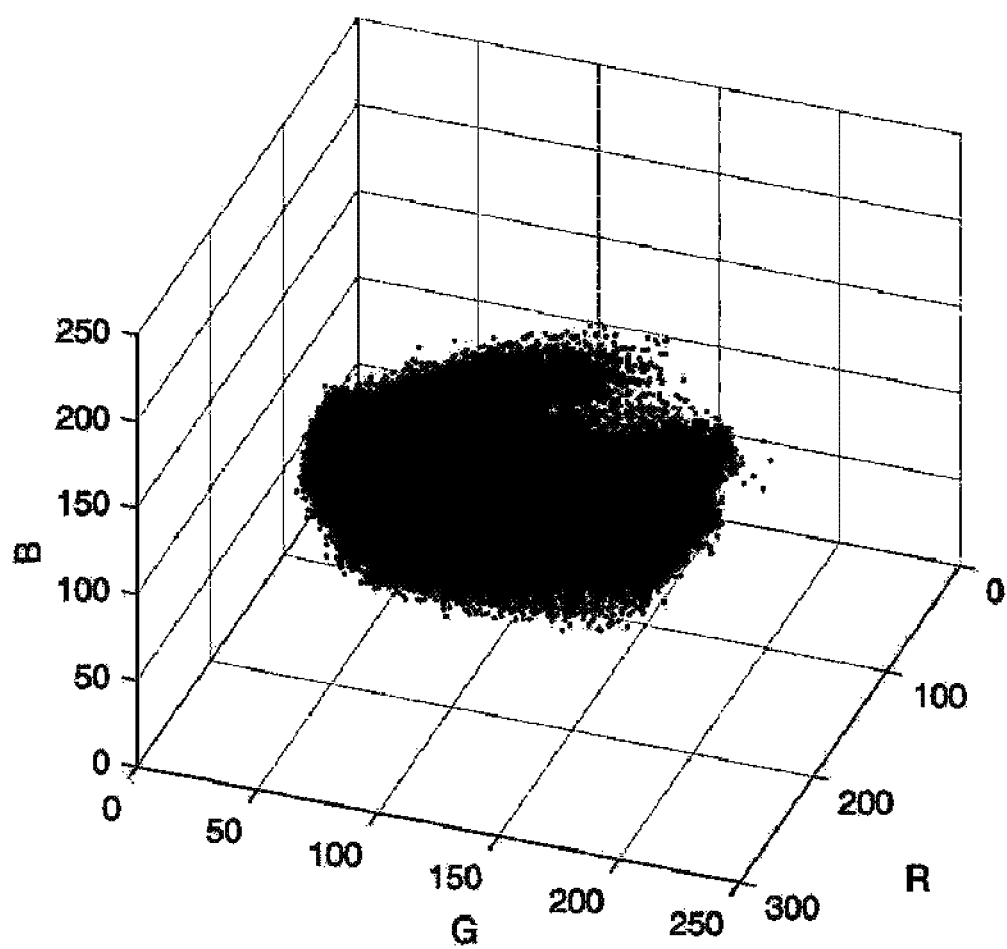
FIG. 5 is a graph showing a pixel distribution of the sample picture in an RGB color space.

FIG. 5 shows a pixel distribution of the sample picture in the RGB color space.

FIG. 5 shows a distribution of pixel values of the pixels in the sample picture of FIG. 4 in a three-dimensional RGB color space, and the representation may be referred to as an RGB pixel distribution of the sample picture.

Referring to FIG. 5, pixels of the sample picture are scattered in the RGB color space to some extent, but the variance of pixel values for each color component may not be greatly different from the variances of pixel values for the other color components. Here, the variance may be referred to as a variation also.

The variance of pixel values for each color component may affect the compression efficiency during a picture encoding. In other words, when there is little significant difference between the variances of pixel values for the color components, the compression efficiency may be lowered due to a large spatial redundancy. Meanwhile, in case that the variance of pixel values for a color component is large compared to the other color components, the picture may be encoded by allocating more bits to the color component having larger variance of pixel values while allocating fewer bits to the color components so that the compression efficiency may be increased due to a reduced spatial redundancy. Such a use of redundancies may be compared to: a sub sampling of Cb- and Cr-components having relatively small variances in the JPEG and MPEG compression; and performing the DCT to increase the variances of low frequency component coefficients and decrease the variances of high frequency component coefficients for allocating more bits to the low frequency component coefficients.

The variance may be represented by $E(X^2)-\{E(X)\}^2$ when the pixel value data is modeled as a random variable X and an expectation or a statistical average is expressed using a notation $E\{\ \}$. However, the present disclosure is not limited thereto, and the variance may be represented by any measurement indices coefficients that may indicate the variation of data, e.g., $E\{|Xn|\}-|E\{X\}|n$ where n is a natural number greater than or equal to 1.

In most of conventional picture encoding methods, pixel values of a picture are transformed from the RGB color space to the YCbCr color space to encode the picture with a high compression efficiency because a single component, Y-component, has a higher variance than the other components, details of which will be described below with reference to FIG. 6.

Figure 6:
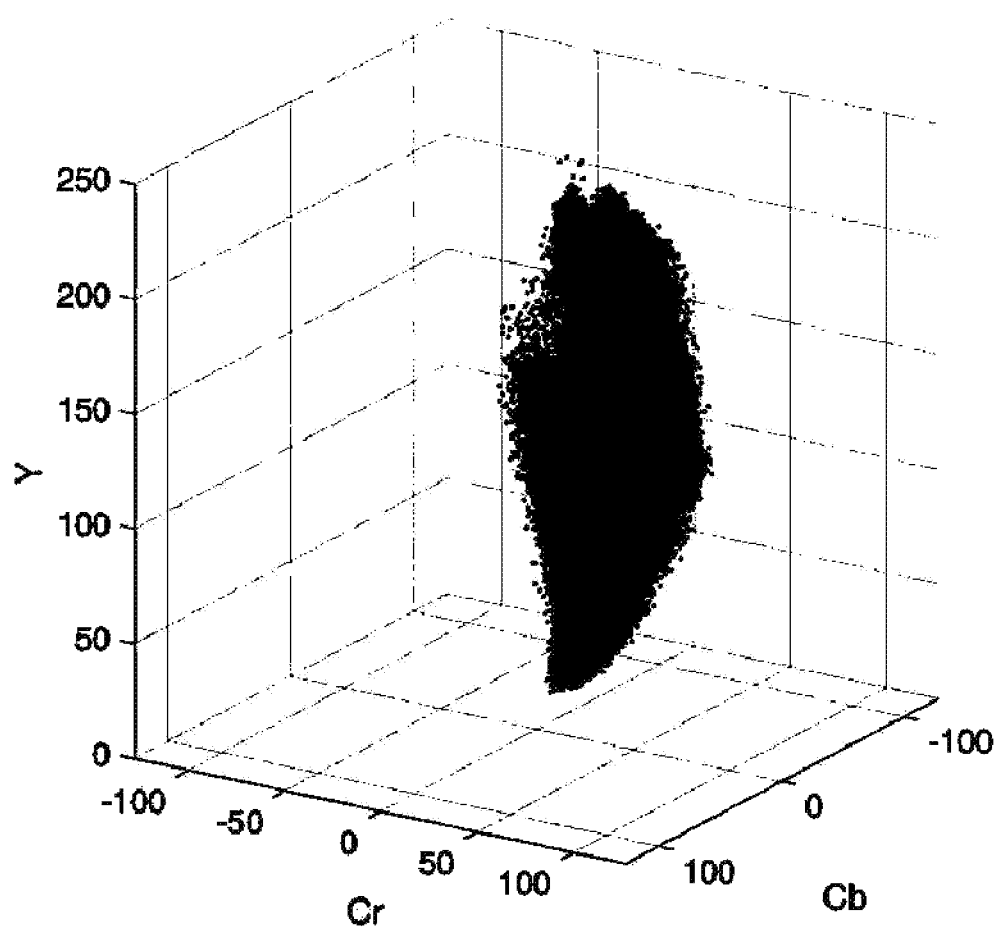
FIG. 6 is a graph showing a pixel distribution of the sample picture in a YCbCr color space.

FIG. 6 shows the pixel distribution of the sample picture in the YCbCr color space.

FIG. 6 may be a representation of pixel values for the sample picture obtained by transforming the pixel distribution in the RGB color space of the sample picture shown in FIG. 5 into the pixel distribution in the YCbCr color space.

Conventional picture encoding methods such as JPEG and MPEG does not directly encode a picture represented in the RGB color space but encodes the picture after transforming the pixel values of the picture from the RGB color space to the YCbCr color space.

The YCbCr color space refers to a system in which each pixel in a picture is represented by one luminance component (i.e., a luma sample) and two color difference components (i.e., chroma samples), and a color of a pixel may be represented by intensities of the three components.

In case that the value of each component in the RGB color space is normalized to a value between 0 and 1, each component in the YCbCr color space may be calculated from the components in the RGB color space as shown in Equation 1, and each component in the RGB color space may be calculated from the components in the YCbCr color space as shown in Equation 2.

$$\begin{bmatrix} Y \\ C_b \\ C_r \end{bmatrix} = \begin{bmatrix} 0.29900 & 0.58700 & 0.11400 \\ -0.16874 & 0.33126 & 0.50000 \\ 0.50000 & -0.41869 & -0.08131 \end{bmatrix} \begin{bmatrix} R \\ G \\ B \end{bmatrix} \quad \text{[Equation 1]}$$

$$\begin{bmatrix} R \\ G \\ B \end{bmatrix} = \begin{bmatrix} 1.00000 & 0.00000 & 1.40200 \\ 1.00000 & -0.34414 & -0.71414 \\ 1.00000 & 1.77200 & 0.00000 \end{bmatrix} \begin{bmatrix} Y \\ C_b \\ C_r \end{bmatrix} \quad \text{[Equation 2]}$$

The components in the RGB color space for the samples shown in FIG. 5 may be transformed into components in the YCbCr color space according to the Equation 1, and FIG. 6 is a representation of the samples in a three-dimensional YCbCr color space. The representation of FIG. 6 may be referred to as a YCbCr pixel distribution of the sample picture.

Referring to FIG. 6, for the pixels of the sample picture represented in the YCbCr color space, the luminance component (Y-component) may be more scattered and have a higher variance than the blue-difference chroma component (Cb-component) and the red-difference chroma component (Cr-component), and thus more bits may be concentrated in the Y-component than the Cb-component and the Cr-component during the picture encoding.

In other words, the transformation into the YCbCr color space allows the concentration of bits on the Y-component, which may enhance the compression efficiency during the picture encoding as described above.

Figure 7:
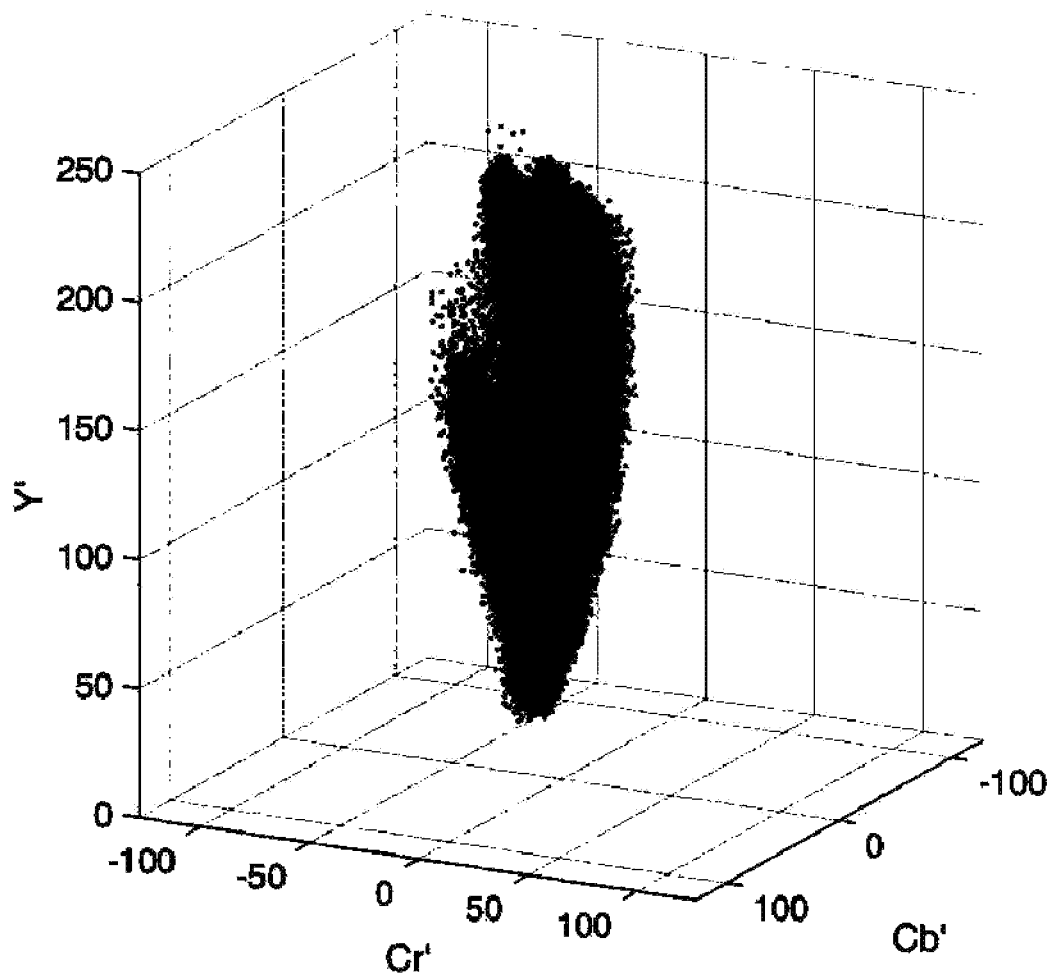
FIG. 7 is graph showing a pixel distribution of the sample picture in a color coordinate system obtained by a transformation of color coordinate axes according to an embodiment of the present disclosure.

FIG. 7 is a graph showing a pixel distribution of the sample picture in a color coordinate system obtained by a transformation of color coordinate axes according to an embodiment of the present disclosure.

A picture encoding method according to an embodiment of the present disclosure may further enhance the compression efficiency than the use of the YCbCr pixel distribution shown in FIG. 6 through a color coordinate axes transformation. In detail, the picture encoding method according to an embodiment of the present disclosure may generate a new YCbCr color coordinate system from the existing YCbCr color coordinate system through the coordinate axes transformation. However, the present disclosure is not limited to a method of transforming the YCbCr color coordinate system to a new color coordinate system through the color coordinate axes transformation, but may be applied to all color coordinate systems and all kinds of the coordinate axes transformation which can enhance the compression efficiency.

Here, the existing YCbCr color coordinate system may be represented by a YCbCr color coordinate system or a first color coordinate system, and a new color coordinate system may be represented by a Y'Cb'Cr' color coordinate system or a second color coordinate system.

The process of transforming the color coordinate axes according to an embodiment of the present disclosure may be generally divided into three operations. Each operation will now be described in detail.

In a first operation, coordinate axes of the first coordinate system is rotated such that the variance of the Y-component is maximized. At this time, a coordinate axis of the Y-component may be fixed at an origin, and a coordinate axis of the Y-component, a coordinate axis of the Cb-component, and a coordinate axis of the Cr-component may be maintained perpendicular to each other. Through the rotation, the coordinate axis of the Y-component as well as the coordinate axis of the Cb-component and the coordinate axis of the Cr-component of the first color coordinate system may be transformed. A color coordinate system generated through the rotation may be referred to as an intermediate color coordinate system.

The first operation may be performed after moving the origin of the first color coordinate system to a central point of the pixel distribution such that an average of each component becomes zero.

In a second operation, a variance of the Cb-component is compared with a variance of the Cr-component in the intermediate color coordinate system, and a component having a larger variance is determined.

In a third operation, coordinate axes of the intermediate color coordinate system is rotated such that the variance of the component determined in the second operation is maximized. At this time, the coordinate axis of the Y-component of the intermediate color coordinate system may be fixed, and the coordinate axis of the Cb-component and the coordinate axis of the Cr-component may be maintained perpendicular to each other. A resultant color coordinate system may be a final color coordinate system generated through the transformation of the color coordinate axes and may be referred to as the second color coordinate system. Each component of the second color coordinate system may be denoted by a Y'-component, a Cb'-component, and a Cr'-component.

The process for transforming the color coordinate axes according to an embodiment of the present disclosure may be performed after down-sampling the components of the existing YCbCr color coordinate system in the three-dimensional space in order to reduce a complexity or a calculation burden.

FIG. 7 is a graph showing a pixel distribution of the sample picture in the Y'Cb'Cr' color coordinate system (i.e., the second color coordinate system) obtained by the transformation of the color coordinate axes on the pixel distribution of the sample picture in the YCbCr color coordinate system (i.e., the first color coordinate system).

Referring to FIG. 7, it can be seen that the variance of the Y'-component in the second color coordinate system has a larger variance than the Y-component in the first color coordinate system, and the Cb'-component and the Cr'-component in the second color coordinate system have a smaller variance than those in the first color coordinate system. In other words, the second color coordinate system has a component which became more prominent than the first color coordinate system. Thus, more bits may be concentrated in the prominent component, or the compression efficiency may be enhanced.

The picture encoding method according to an embodiment of the present disclosure may transform the color coordinate axes through the above-described process. The information about the coordinate axes transformation may be included in a compressed picture file in a form of overhead information for each picture. Here, the data regarding the overhead information has a very small size compared to the size of the compressed picture file and thus may be ignorable in the total amount of data.

The size of the data regarding the coordinate axes transformation information may be reduced further by referring to a previous picture or a previous block. For example, in case that a still picture is partitioned into blocks having a size 8×8 pixels and the blocks are sequentially compressed in a direction from a upper left block to the lower right block during a JPEG picture compression, the transformation of the color coordinate axes may be performed in a unit of the block and the coordinate axis transformation information for each block may be included in the form of the overhead information according to an embodiment of the present disclosure. Here, the coordinate axes transformation information may be included in the form of the overhead information for each block, but the coordinate axes transformation information for a current block may be obtained by performing color coordinate axes transformation based on previous blocks which are compressed already or some pixels in the previous blocks. The coordinate axes transformation information for the current block obtained as such may be referred to as predicted coordinate axes transformation information.

Thus, according to the picture encoding method, the transformation of the coordinate axes is performed for each of the blocks into which a picture is partitioned, and the coordinate axes transformation information may exists for each block. Alternatively, the coordinate axes transformation information may be predicted based on the previous blocks or some pixels of the previous blocks, and there may exist predicted coordinate axes transformation information. In a latter case, the overhead information for each block may include information indicating whether the coordinate axes transformation information is predicted or actual.

Here, the information indicating whether the coordinate axes transformation information is predicted or actual may further include information about the previous blocks or some pixels of the previous blocks when the transformation of the coordinate axes is performed for the current block based on the previous blocks or some pixels in the previous blocks and there exists predicted coordinate axes transformation information.

The picture encoding method according to an embodiment of the present disclosure may or may not perform the color coordinate axes transformation for each of the blocks into which a picture is partitioned, and the overhead information for each block may include the transformation execution information indicating whether the color coordinate axes were transformed or not.

Here, the transformation execution information may be assigned with one bit as an indicator or a flag, The transformation of the coordinate axes may be omitted when the transformation results in little enhancement in the compression efficiency or when the increase in the compression efficiency is less than a preset value.

Figure 8:
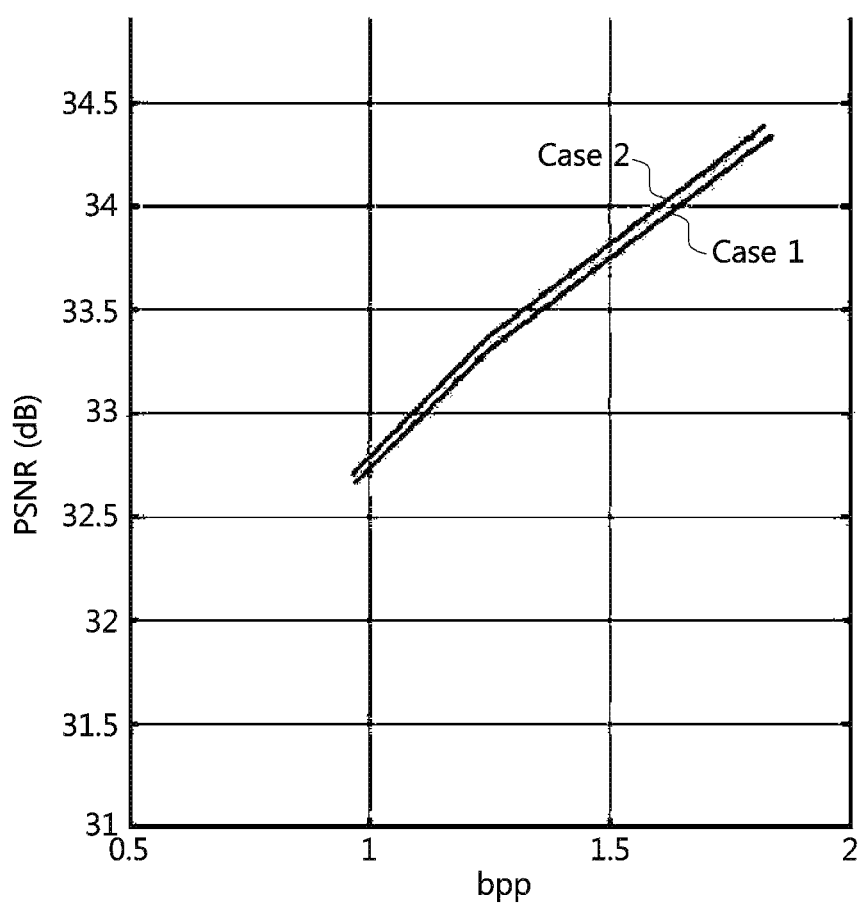
FIG. 8 is a graph showing an enhanced compression efficiency when a picture encoding is performed after a transformation of color coordinate axes according to an embodiment of the present disclosure.

FIG. 8 is a graph showing an enhanced compression efficiency when the picture encoding is performed after the transformation of color coordinate axes according to an embodiment of the present disclosure.

Referring to FIG. 8, a first case (denoted by 'case 1') denotes a case where the sample picture of FIG. 4 is compressed by the typical JPEG scheme, and a second case (denoted by 'case 2') is a case where the sample picture encoded by the JPEG scheme after the color coordinate axes are transformed according to an embodiment of the present disclosure.

Here, the transformation execution information may be included in the overhead information for each block and may include a 1-bit indicator. In addition, the transformation execution information may include an indicator. The indicator has a value of zero when the transformation of the color coordinate axes according to an embodiment is performed while having a value of one when the transformation of the color coordinate axes is not performed.

Also, the prediction information may be included in the overhead information for each block, and the transformation execution information may be included only in the overhead information of a block for which the transformation of the color coordinate axes is performed. According to an embodiment of the present disclosure, when the transformation of the color coordinate axes is performed for the current block based on the previous blocks or some pixels of the previous blocks according to the prediction information, the pixel distribution information of the current block may be predicted and acquired based on all the pixels in four neighboring blocks, i.e., the left, upper left, upper, and upper right blocks of the current block, the transformation of the color coordinate axes is performed for the current block based on the acquired pixel distribution information of the current block.

Referring to FIG. 8, the compression efficiencies of the first and second cases in the picture encoding and decoding may be compared with each other by use of a peak signal-to-noise ratio (PSNR) and a bit per pixel (bpp). It can be seen that the second case indicating the picture encoding method using the color coordinate axes transformation according to an embodiment of the present disclosure has a superior compression efficiency than the first case. Here, it should be noted that the PSNR is indicated in units of decibels (dB) based on logarithm.

Though the above description was focused on the JPEG compression with a block size of 8×8 pixels, the present disclosure may be applied to an MPEG compression. In such a case, the block size may not be fixed at 8×8 pixels and may be variable.

In other words, when the picture encoding method using the color coordinate axes transformation according to an embodiment of the present disclosure is applied to the MPEG compression, the encoding process may differ from the process for the JPEG compression in configurations for predicting the current block, by the intra frame prediction or a spatial prediction, using the neighboring blocks and pixels in a previously-compressed intra frame, predicting the current block, by the inter frame prediction or a temporal prediction, using the neighboring blocks and pixels in the inter frames, calculating a prediction error, and performing the compression.

Figure 9:
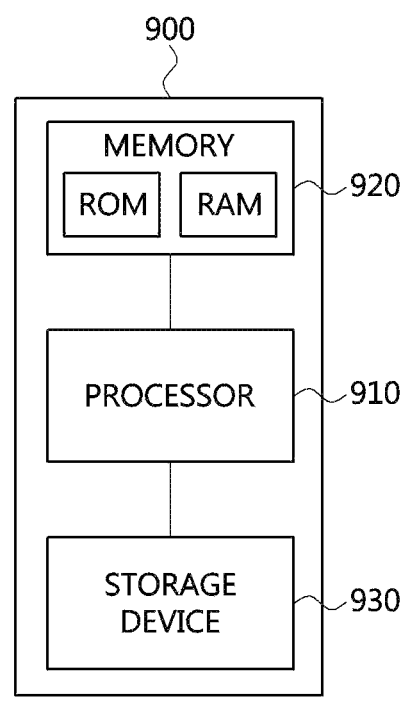
FIG. 9 is a block diagram of a picture encoding device according to an embodiment of the present disclosure.

FIG. 9 is a block diagram of a picture encoding device according to an embodiment of the present disclosure.

Referring to FIG. 9, the picture encoding device 900 according to an embodiment of the present disclosure may include at least one processor 910, a memory 920, and a storage 930.

The picture encoding device 900 according to an embodiment of the present disclosure may be disposed before or after a general picture encoding and decoding device or may be mounted in the general picture encoding and decoding device to perform necessary processes before or after the picture encoding and decoding operation, but the present disclosure is not limited thereto.

The processor 910 may execute program commands or instructions stored in the memory 920 and/or the storage 930. The processor 910 may be a central processing unit (CPU), a graphics processing unit (GPU), or a dedicated processor suitable for performing the methods of the present disclosure. The memory 920 and the storage 930 may include a volatile storage medium and/or a non-volatile storage medium. For example, the memory 920 may include a read-only memory (ROM) and/or a random access memory (RAM).

The memory 920 may store at least one instruction to be executed by the processor 910. The at least one instruction may include an instruction for acquiring pixel distribution information for the picture in the first color coordinate system, an instruction for determining a first component having the largest variance among the components in the first color coordinate system on the basis of the pixel distribution information, an instruction for rotating the coordinate axes of the first color coordinate system around the origin such that the variance of the first component is maximized to acquire an intermediate color coordinate system, an instruction for acquiring a second component having the larger variance between the remaining components of the intermediate color coordinate system other than the first component, an instruction for rotating the coordinate axes of the intermediate color coordinate system around the origin such that the variance of the second component is maximized to acquire the second color coordinate system, and an instruction for encoding the picture on the basis of the pixel distribution information in the second color coordinate system.

In addition, the at least one instruction may include an instruction for generating coordinate axes transformation information for the picture on the basis of a difference between the pixel distribution information in the first color coordinate system and the pixel distribution information in the second color coordinate system or an instruction for generating the overhead information for the picture on the basis of the coordinate axes transformation information for the picture.

In addition, the at least one instruction may include at least one of: an instruction for determining whether to perform the transformation of the coordinate axes for the picture on the basis of a difference between the pixel distribution information in the first color coordinate system and the pixel distribution information in the second color coordinate system, an instruction for generating the transformation execution information depending on whether to perform the transformation of the coordinate axes for the picture, and an instruction for generating the overhead information for the picture based on the transformation execution information.

In addition, the at least one instruction may include at least one of: an instruction for acquiring the pixel distribution information in the first color coordinate system for the picture on the basis of the pixel distribution information in the first color coordinate system for at least one different picture and an instruction for generating the overhead information for the picture on the basis of the at least one different picture.

Here, the first color coordinate system may include a YCbCr color coordinate system, and the first component may include a Y-component.

Figure 10:
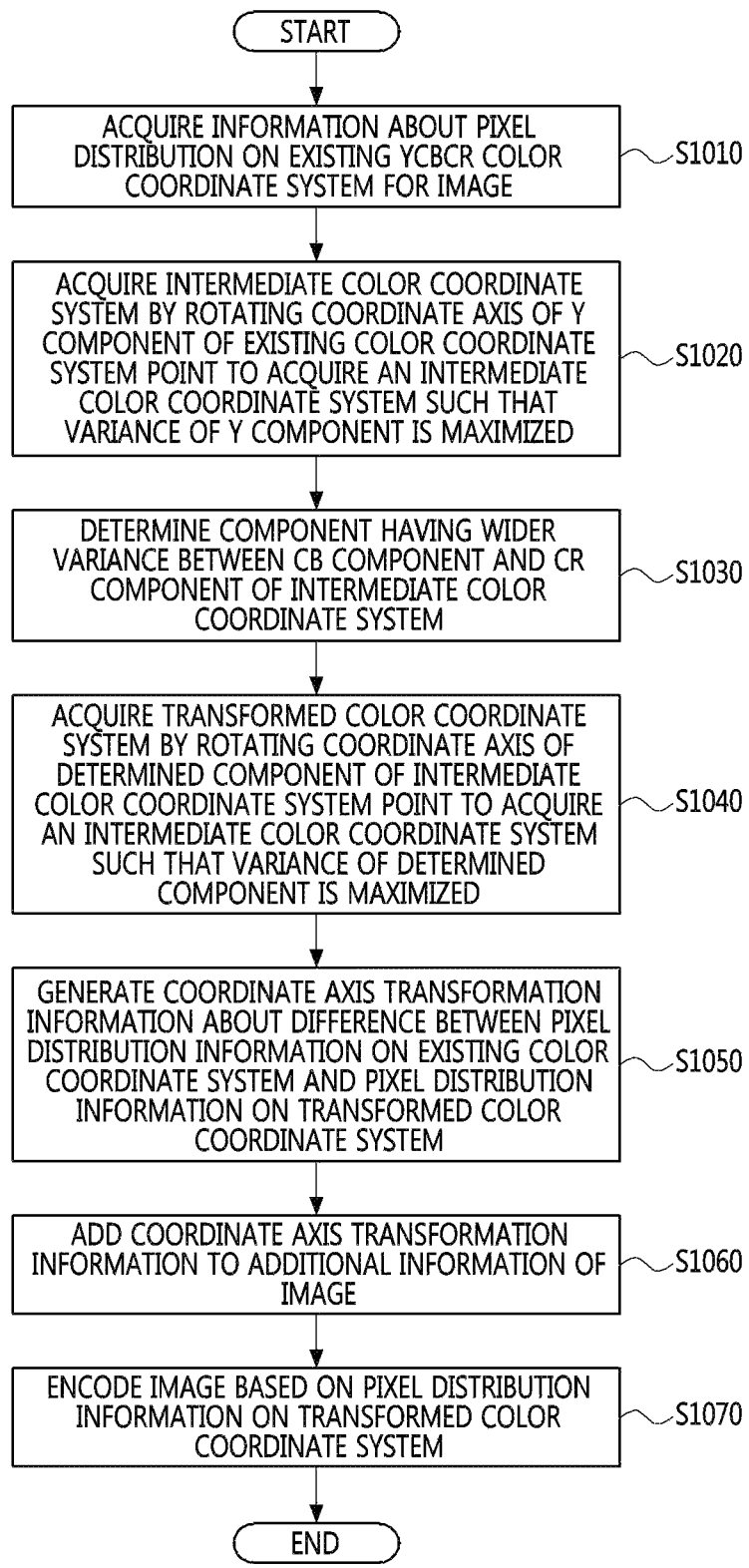
FIG. 10 is a flowchart showing a picture encoding method according to an embodiment of the present disclosure.

FIG. 10 is a flowchart showing a picture encoding method according to an embodiment of the present disclosure.

Referring to FIG. 10, the picture encoding device according to an embodiment of the present disclosure may first acquire pixel distribution information for a picture in the existing YCbCr color coordinate system (S1010), and acquire an intermediate color coordinate system by rotating a coordinate axis of the Y-component of the existing YCbCr color coordinate system such that the variance of the Y-component is maximized (S1020). Here, the coordinate axes of the existing YCbCr color coordinate system are rotated by rotating the coordinate axis of the Y-component because the Y-component typically shows the largest variance among the Y-component, the Cb-component, and the Cr-component in the YCbCr color coordinate system, but the axis to be rotated is not limited to the Y-component axis. The rotation of the coordinate axes of the existing YCbCr color coordinate system may be carried out while maintaining the coordinate axis of the Y-component, the coordinate axis of the Cb-component, and the coordinate axis of the Cr-component perpendicular to each other. Before the rotation, the origin of the coordinate system may be displaced based on the pixel distribution, i.e., such that the average of each component in the pixel distribution may be zero.

Subsequently, the picture encoding device may determine a component showing a larger variance between the Cb-component and the Cr-component in the intermediate color coordinate system (S1030) and acquire a transformed color coordinate system by rotating coordinate axes of the intermediate color coordinate system such that the variance of the determined component is maximized (S1040). Here, the rotation of the coordinate axes of the intermediate color coordinate system may be carried out around the origin of the intermediate color coordinate system while maintaining the coordinate axis of the Cb-component and the coordinate axis of the Cr-component perpendicular to each other. The transformed color coordinate system may be a final color coordinate system.

The picture encoding device may generate coordinate axis transformation information on the basis of a difference between the pixel distribution information in the existing color coordinate system and the pixel distribution information in the transformed color coordinate system (S1050) and may add the generated coordinate axis transformation information to additional information for the picture (S1060). Then, the picture encoding device may encode the picture on the basis of the pixel distribution information in the transformed color coordinate system (S1070). Afterwards, the picture decoding device may inversely transform the pixel distribution information in the transformed coordinate system into the pixel distribution information in the existing color coordinate system on the basis of the coordinate axis transformation information.

In other words, while a conventional picture encoding device typically acquires and encodes pixel values information in the YCbCr color coordinate system, the picture encoding device according to present disclosure may acquire and encode pixel values information in the Y'Cb'Cr' color coordinate system. The picture decoding device may perform an inverse operations of those described above, so that information acquired by the decoding operation may be the information in the Y'Cb'Cr' color coordinate system and such information may be inversely transformed into the YCbCr color coordinate system.

The operations of the methods according to an embodiments may be embodied as computer-readable programs or codes on a computer-readable recording medium. The computer-readable recording medium is any data storage device that can store data that can thereafter be read by a computer system. In addition, the computer-readable recording medium may also be distributed over network-coupled computer systems so that the computer-readable program or code is stored and executed in a distributed fashion.

In addition, the computer-readable recording medium may include a hardware device specially constructed to store and execute a program instruction, for example, a ROM, a RAM, and a flash memory. The program instruction may include a high-level language code executable by a computer through an interpreter in addition to a machine language code made by a compiler.

Some of the aspects of the present disclosure have been described in the context of the device but may represent the description of a method corresponding thereto, and a block or a device corresponds to an operation of a method or a feature thereof. Similarly, some of the aspects having been described in the context of the method may also be represented by a block or items corresponding to the method or a feature of a device corresponding to the method. Some or all of the operations of the method may be performed, for example, by (or using) the hardware device, such as a microprocessor, a programmable computer, or an electronic circuit. In some embodiments, one or more of the most important operations of the method may be performed by such a device.

In some embodiments, a programmable logic device (for example, a field programmable gate array) may be used to perform some or all of the above described functions of the methods. In some embodiments, a field programmable gate array may operate together with a microprocessor to perform one of the above described methods. In an implementation, the methods may be performed by any hardware device.

Although the embodiments of the present disclosure have been described in detail, it should be understood that various substitutions, additions, and modifications are possible without departing from the scope and spirit of the present disclosure, and the scope of the present disclosure is limited by the claims and the equivalents thereof

What is claimed is:
1. A picture encoding method, comprising:
acquiring pixel distribution information for a picture in a first color coordinate system;
determining a first color component showing a largest variance in pixel values among color components of pixels of the picture in the first color coordinate system on the basis of the pixel distribution information;
rotating coordinate axes of the first color coordinate system around an origin while maintaining a coordinate axis of one of the color components, excluding the first color component, and a coordinate axis of the other one of the color components perpendicular to each other such that the variance of the first color component is maximized to acquire an intermediate color coordinate system;
determining a second color component showing a larger variance in pixel values between color components, excluding the first color component, of the intermediate color coordinate system;
rotating coordinate axes of the intermediate color coordinate system around the origin such that the variance of the second color component is maximized to acquire a second color coordinate system; and
encoding the picture on the basis of pixel distribution information in the second color coordinate system.

2. The method of claim 1, further comprising:
generating coordinate axes transformation information for the picture on the basis of a difference between the pixel distribution information in the first color coordinate system and the pixel distribution information in the second color coordinate system.

3. The method of claim 2, further comprising:
generating additional information about the picture on the basis of the coordinate axes transformation information for the picture.

4. The method of claim 1, further comprising:
determining whether to transform coordinate axes for the picture on the basis of a difference between the pixel distribution information on the first color coordinate system and the pixel distribution information on the second color coordinate system.

5. The method of claim 4, further comprising:
generating information of whether the coordinate axes are transformed depending on whether the coordinate axes are transformed; and
generating additional information about the picture based on the information of whether the coordinate axes are transformed.

6. The method of claim 1, wherein acquiring the pixel distribution information for the picture in the first color coordinate system comprises:
acquiring the pixel distribution information for the picture in the first color coordinate system on the basis of pixel distribution information for at least one another picture in the first color coordinate system.

7. The method of claim 6, further comprising:
generating additional information about the picture on the basis of information about the at least one another picture.

8. The method of claim 1, wherein the first color coordinate system includes a YCbCr color coordinate system, and the first color component includes a Y-component.

9. A picture encoding device, comprising:
a processor; and
a memory storing at least one instruction to be executed by the processor, wherein the at least one instruction when executed by the processor causes the processor to:

acquire pixel distribution information for a picture in a first color coordinate system;

determine a first color component showing a largest variance in pixel values among color components of pixels in the first color coordinate system on the basis of the pixel distribution information;

rotate coordinate axes of the first color coordinate system around an origin such that the variance of the first color component is maximized to acquire an intermediate color coordinate system;

determine a second color component showing a larger variance in pixel values between color components, excluding the first color component, of the intermediate color coordinate system;

rotate coordinate axes of the intermediate color coordinate system around the origin while maintaining a coordinate axis of one of the color components, excluding the first color component, and a coordinate axis of the other one of the color components perpendicular to each other such that the variance of the second color component is maximized to acquire a second color coordinate system; and encode the picture on the basis of pixel distribution information in the second color coordinate system.

10. The device of claim 9, wherein the at least one instruction when executed by the processor further causes the processor to:

generate coordinate axes transformation information for the picture on the basis of a difference between the pixel distribution information in the first color coordinate system and the pixel distribution information in the second color coordinate system.

11. The device of claim 10, wherein the at least one instruction when executed by the processor further causes the processor to:

generate additional information about the picture on the basis of the coordinate axes transformation information for the picture.

12. The device of claim 9, wherein the at least one instruction when executed by the processor further causes the processor to:

determine whether to transform coordinate axes for the picture on the basis of a difference between the pixel distribution information on the first color coordinate system and the pixel distribution information on the second color coordinate system.

13. The device of claim 12, wherein the at least one instruction when executed by the processor further causes the processor to:

generate information of whether the coordinate axes are transformed depending on whether the coordinate axes are transformed; and generate additional information about the picture based on the information of whether the coordinate axes are transformed.

14. The device of claim 9, wherein the at least one instruction when executed by the processor further causes the processor to:

acquire the pixel distribution information for the picture in the first color coordinate system on the basis of pixel distribution information for at least one another picture in the first color coordinate system.

15. The device of claim 14, wherein the at least one instruction when executed by the processor further causes the processor to:

generate additional information about the picture on the basis of information about the at least one another picture.

16. The device of claim 9, wherein the first color coordinate system includes a YCbCr color coordinate system, and the first color component includes a Y-component.

* * * * *